United States Patent [19]

Herzhoff et al.

[11] 3,900,326

[45] Aug. 19, 1975

[54] PROCESS AND APPARATUS FOR HEATING UP AND THERMOSTATING SOLUTIONS OF HIGH SOLIDS CONTENT FOR COATING OF WEB MATERIALS AT A GIVEN TEMPERATURE AND FOR LOWERING THE VISCOSITY OF SUCH SOLUTIONS WHICH HAVE A STRUCTURAL VISCOSITY

[75] Inventors: Peter Herzhoff, Leverkusen; Hans Gref, Cologne-Stammheim; Fritz Maus, Cologne-Flittard; Stephan Platz, Leverkusen; Josef Friedsam, Langenfeld; Wolfgang Schweicher, Leverkusen; Rolf Behr, Leverkusen; Willi Wasser, Leverkusen; Kurt Browatzki, Opladen, all of Germany

[73] Assignee: Agfa-Gevaert Aktiengesellschaft, Leverkusen, Germany

[22] Filed: July 2, 1973

[21] Appl. No.: 375,498

Related U.S. Application Data

[63] Continuation-in-part of Ser. No. 860,039, Sept. 22, 1969, abandoned.

[52] U.S. Cl. ................. 96/114.8; 96/94 R; 159/13; 427/420; 260/412.4
[51] Int. Cl. ............................................. G03c 1/74
[58] Field of Search ........ 117/34, 66, 164; 96/94 R; 159/13; 260/412.4

[56] References Cited
UNITED STATES PATENTS

| | | |
|---|---|---|
| 1,567,455 | 12/1925 | Newton .............................. 202/237 |
| 2,519,618 | 8/1950 | Wilson ................................. 159/13 |
| 2,651,647 | 9/1953 | Greenfield ....................... 260/412.4 |
| 2,753,594 | 7/1956 | Buck ..................................... 159/13 |
| 2,779,724 | 1/1957 | Dunning et al. ..................... 159/13 |
| 3,451,990 | 6/1969 | Sole ................................. 260/412.4 |
| 3,476,570 | 11/1969 | Moustafa ....................... 260/412.4 |

*Primary Examiner*—William R. Trenor
*Attorney, Agent, or Firm*—Connolly and Hutz

[57] ABSTRACT

A process and apparatus for improving and maintaining the viscosity of gelatino silver halide emulsions with a high solids content in a reservoir bath for tape coating a photographic emulsion on a support, wherein the coating emulsion is partly withdrawn from the bath and circulated through a falling film evaporator to which a vacuum is applied and processed to modify, control and improve the viscosity of the withdrawn emulsion. The viscosity of the viscous emulsion is controlled by passing the emulsion in a falling film through an evaporator with ballast steam injected under high velocity into the falling film in a parallel direction to produce a shearing force. The evaporator contains a reduced atmosphere through which the falling film passes. The steam is partially condensed in the emulsion and the emulsion is also heated through the walls of the evaporator with resultant evaporation. The temperature of the emulsion at the outlet is directly related to the temperature/vapor pressure curve of the reduced atmosphere in the evaporator and viscosity is attained which is maintained until the emulsion is applied to the web support.

4 Claims. 2 Drawing Figures

PROCESS AND APPARATUS FOR HEATING UP AND THERMOSTATING SOLUTIONS OF HIGH SOLIDS CONTENT FOR COATING OF WEB MATERIALS AT A GIVEN TEMPERATURE AND FOR LOWERING THE VISCOSITY OF SUCH SOLUTIONS WHICH HAVE A STRUCTURAL VISCOSITY

This is a continuation-in-part of our copending application Ser. No. 860,039, filed Sept. 22, 1969, now abandoned.

BACKGROUND OF THE INVENTION

This invention relates to a process and to an apparatus for improving the concentration, and viscosity of solutions having a high solids content which are to be used for coating a tape particularly solutions of photographic gelatino-silver halide emulsions.

The invention more particularly relates to a process and an apparatus for keeping solutions of high solids content which are to be cast on a band, preferably photographic emulsions, at a given temperature and for lowering the viscosity of such solutions which have a structural viscosity. The emulsion is applied to a web support at the viscosity attained in the processing.

In the coating of a tape with a gelatino-silver halide emulsion it is desirable to keep small the reservoir from which the coat is cast on the substrate which is a moving tape. At the same time it is necessary to continuously resupply an adequate quantity of emulsion to the small reservoir and finally it is essential that emulsion be not heterogeneous. Therefore, the gelatino-silver halide emulsion for casting is improved if the emulsion from the fresh supply is modified, in viscosity.

Many processes which employ film evaporation have been used for such purposes as improving separation of liquids, improving heat exchange in distillation processes, and evaporation from a pulp slurry and of a photographic emulsion. For example it has been known to distribute a fluid to be evaporated in films in tubes and then recirculate the vapor formed from the distilled film to improve turbulence in the falling film. This is known to improve heat transfer. This, however, does not provide the action necessary for modifying viscosity of a gelatino-silver halide emulsion.

The heating up of coating solutions has previously been carried out by replacing heat losses by transferring heat from a heating medium through the wall of double walled vessels and pipes. The heating medium, e.g. warm water, must be at a higher temperature than the required temperature of the coating solution. This results in a heat gradient in the coating solution from the heated wall to the interior of the solution. This gives rise to a viscosity gradient in the coating solution in the opposite direction. Both these gradients may cause differences in the thickness of the coated layer and may also produce undesired smeary patches.

Also when preparing color photographic emulsions the viscosity of the coating solution is increased to a value several times its original value by the addition of color components without there being any increase in the solids content. Coating devices are not able to apply such highly viscous solutions and it has been customary to lower the viscosity by the addition of considerable quantities of water. This means that the thickness of the wet layer is increased in order to apply a given amount of solids. Hence the rate of drying also had to be increased, or if the dryers were already operating at their maximum drying capacity, it was necessary to reduce the rate of coating depending on the amount of water added.

It is important that the photographic emulsion have proper drying properties after casting on a moving substrate. The drying step is a vital aspect in production of optimum photographic film.

It is an object of this invention to provide a procedure for modifying the viscosity of gelatino-silver halide emulsions without substantially modifying the aqueous content or the drying characteristics of the emulsion.

SUMMARY OF THE INVENTION

A gelatino-silver halide emulsion is drawn from a coating reservoir and the coating solution is run through, or circulated in, a falling film evaporator of known type to which a vacuum is applied. The evaporator is supplied with a quantity of steam under pressure which is injected from an external steam source and is mixed up with the downwardly flowing solution in the evaporator by directing the steam into the falling film in a plane parallel to the direction of flow. The gelatino-silver halide emulsion has a viscosity of between 20–400 cp and is a stable mass of finely divided crystalline silver halide dispersed and suspended without dissolving. The gelatin is a protein which acts as a binding medium. The emulsion has an aqueous content to provide flowability. The ballast steam is introduced into the falling film evaporator at a high steam velocity so as subject a thin film of the emulsion flowing down heated surfaces of the evaporator to a high shearing force from the injected steam. The steam becomes entrained in the emulsion under the pressure of the evaporator head and condenses and thereafter evaporates partially from the emulsion under the reduced pressure of the column of the evaporator.

At the end of the column there is a separator. There are equilibrium conditions in the separator and there is an atmosphere of saturated steam in the separator of the falling film evaporator. The coating solution always leaves the evaporator at exactly that temperature on the steam diagram which is determined by the pressure in the separator. Also the viscosity is attained which enables proper layering on the web support while maintaining the aqueous content of the emulsion. This pressure is regulated so that it is kept constant, accordingly the temperature of the coating solution is equally constant. Differences between the temperature of the coating solution at the inlet and at the outlet of the evaporator are accounted for by the heat of condensation of the ballast steam condensing in the coating solution or by the heat of evaporation of the water evaporating from the coating solution.

An apparatus illustrating the process of this invention is shown diagrammatically in FIG. 1, and FIG 2 illustrates the relationship between temperature and pressure in the separator stage.

DETAILED DESCRIPTION

Figure 1:
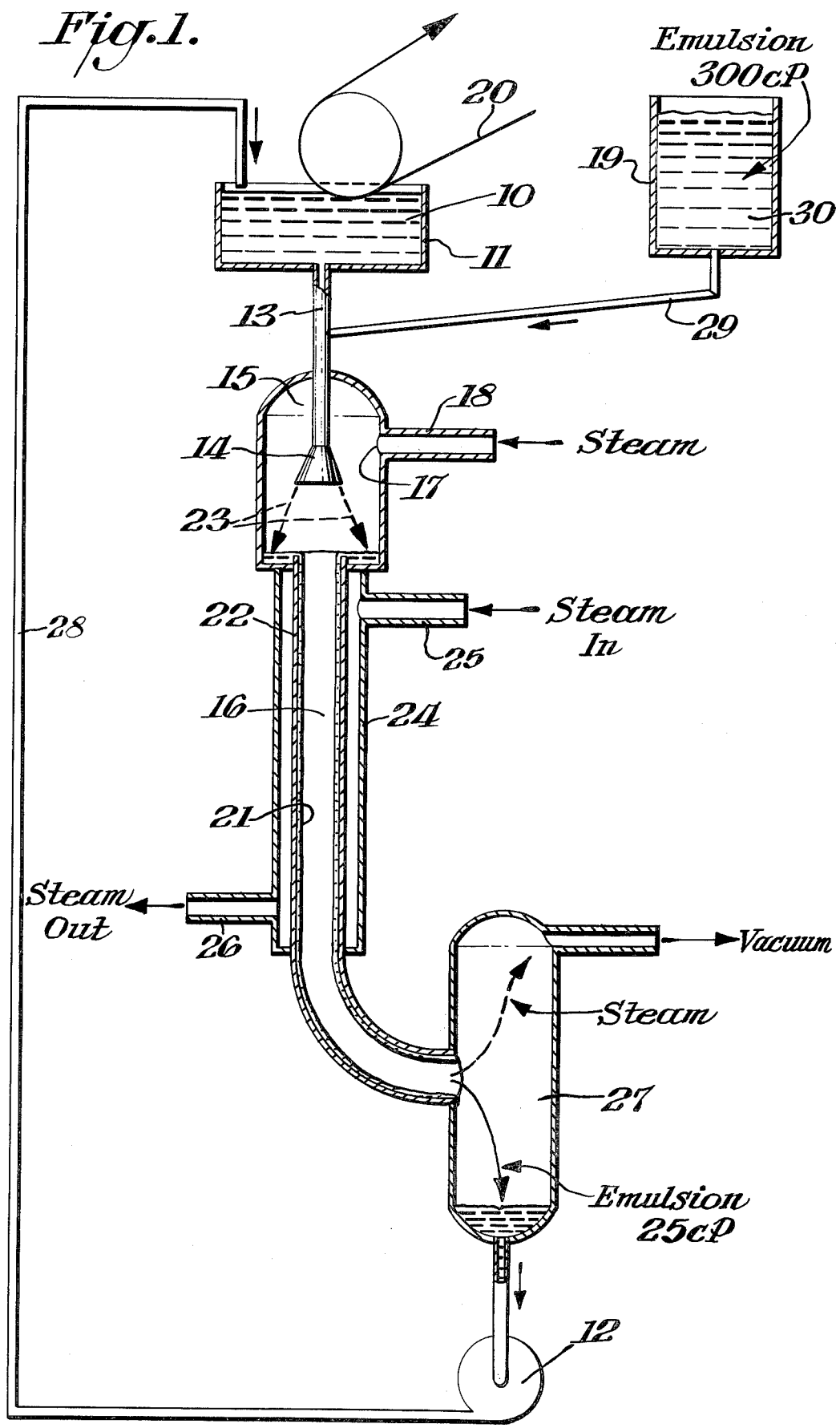

FIG. 1 shows the apparatus for applying the controlled viscosity photographic emulsion to a web support. A photographic emulsion 10 is circulated from a vessel 11 for supplying a coating by a pump 12 through the system which includes a conduit 13 from the vessel 11 through a sprinkler 14 into a head 15 of a falling film evaporator 16. The evaporator 16 and the head 15 receive both the emulsion 10 introduced through sprinkler 14 and injected steam introduced through nozzle 17. A conduit 18 is connected to the head 15 for injecting steam. In the head 15 the injected steam is intensively mixed with the sprayed emulsion 10. Suitable evacuating means creates a reduced atmosphere within the head 15 and the evaporator 16. A vessel 19 contains a supply of additional emulsion which additional emulsion is supplied to the evaporator 16 at the same rate of quantity as the quantity of emulsion drawn from the vessel 11 in the coating on a moving web 20 which passes through vessel 11, so that the feed from vessel 19 balances the depletion by coating of emulsion 10 from vessel 11.

Compared with the quantity worked up by the coating device, the quantity of solution kept in circulation must be of a relatively large quantity. In order to supply injected steam as required in the invention, to the falling film evaporator, the head of the evaporator is provided with a steam supply pipe. The source from which the steam is obtained is a vacuum distillate steam generator, because ordinary mains steam would add impurities to the coating solution which could not be tolerated. Also owing to its being superheated (with respect to the less than atmospheric pressure in the falling film evaporator) it would subject the emulsions to excessive thermal stress.

The emulsion 10 forms a falling film 21 on the inner surfaces 22 of the evaporator 16. The injected steam forms a stream 23 in the same general direction as that of the falling film 21 and accordingly, by moving relative to the film 21 creates a shearing force.

The falling film evaporator 16 has a steam jacket 24 for supplying heat through the surface 22 to the downflowing emulsion in the falling film 21 so as to provide a temperature in the emulsion whereby the water incorporated in the emulsion by condensation is balanced by reevaporation. Means are thus provided for avoiding dilution. The jacket steam is introduced through inlet conduit 25 and removed through outlet conduit 26.

The treated emulsion 10 removed from the bottom of the evaporator 14 at a desired viscosity is returned to the supply vessel 11 for application to the web support.

Figure 2:
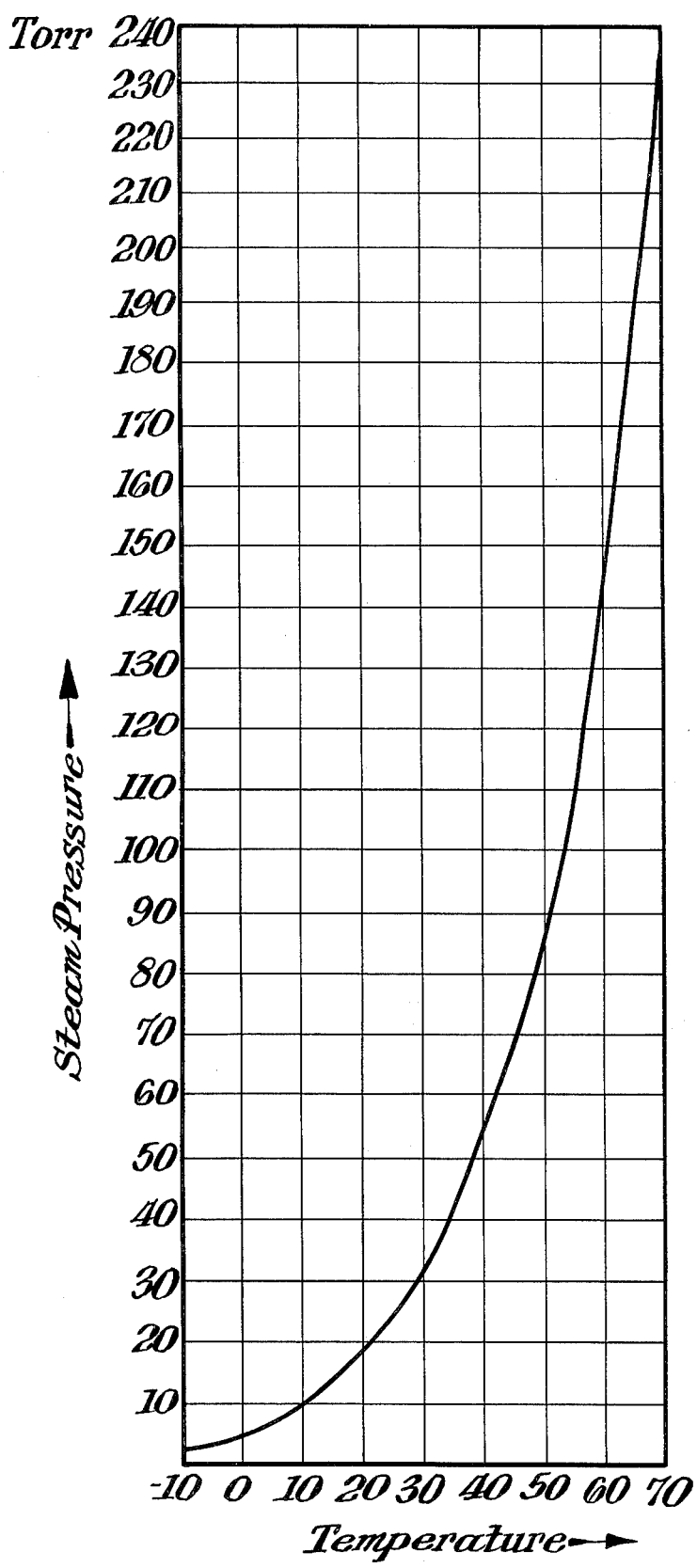

It has been discovered that the gelatino-silver halide emulsion in a coating bath for casting as a photographic coating can be provided with a reduced viscosity without substantially altering the aqueous content by processing emulsion of a viscosity of 20 up to 400 cp when withdrawn from the coating bath to process the emulsion to decrease the viscosity to between 2–100 cp while providing an emulsion having a solids content of 8 to 14 percent by weight. The emulsion withdrawn from the coating bath to be processed is fed first into the head of the evaporator column where the temperature is 42°–67°C. and pressure is only partially reduced to from 60–200 mm Hg and the emulsion is distributed throughout the relatively broad area of the head. Thus the steam is injected into and becomes entrained in and intensively mixed with the emulsion under the conditions of temperature and pressure of the head area. The emulsion is then passed as a film flowing downwardly in a column over a surface heated to a temperature of about 29°–42° under a reduced pressure decreasing from a range of 60–200 mm Hg at the head of the column to 30 to 60 mm Hg in the column and a temperature of from 47°–60° at the head of the column to a temperature of 29°–42°C in the column. Thus, representatively, a pressure midway in the column is 30 mm Hg when the head pressure is 60 mm Hg, and 60 mm Hg when the head pressure is 200 mm Hg and to 29°–40°C at the end of the column. The flowing film is subjected to the introduction of high velocity steam injected into the column at the head and streaming through the column at a velocity of 150–300 meters per second. The injected steam leaves a separator 27 at the end of the column and separates from the emulsion at a pressure ranging from 30 to 60 mm Hg and a temperature of between 29° and 42°C. Whereas the steam and the emulsion are not in equilibrium within the falling film evaporator column, on reaching the separator the emulsion/steam mixture moves into equilibrium conditions. Under these equilibrium conditions according to this invention the temperature and the pressure in the separator during the separation step are at values which are represented by the curve illustrated in FIG. 2. Thus it is possible to adjust the temperature of the emulsion leaving the separator. This provides for an effective and inexpensive temperature control without employing temperature sensing means and additional heating power.

The emulsion 10 with reduced viscosity but maintained aqueous content is circulated back to the vessel 11 through conduit 28 by pump 12. The additional emulsion is flowed into the system from the vessel 19 through conduit 29. The added emulsion from a supply 30 in the vessel 19 has a viscosity which needs to be adjusted for proper coating, as for example a viscosity of 300 cp.

The following are illustrative of the process of this invention:

| | |
|---|---|
| Pressure in the separator 27 | 50 mm Hg. |
| Temperature in the separator 27 | 38°C |
| Pressure in the head 15 | 100–120 mm Hg. |
| Temperature in the head 15 of the evaporator 16 | 51–55°C |
| Viscosity of emulsion before processing | 300 cp |
| Viscosity of emulsion after processing | 25 cp |

This example illustrates a condition according to this invention in which the temperature/pressure relationship in the separator provides for the desired separation of the steam from the emulsion to provide an emulsion with reduced viscosity but a maintained aqueous content. The solids content of the emulsion is between about 8 percent and about 14 percent. The viscosity decrease is apparently due to a change in the structural properties of the gelatin emulsion. It is assumed that the protein molecules in the gelatin emulsion arrange themselves in a chain order when the liquid emulsion is allowed to stay in an undisturbed state. Such a structural short chain order is responsible for a high viscosity and a pseudo-plastic behavior. When the liquid gelatin emulsion is subjected to a thermo-mechanical shock treatment according to the present invention, the chain order and the viscosity is lowered. By the term, thermo-mechanical shock treatment, is meant a fast and simultaneous supply of heat and mechanical energy, such as shearing action, to a volume element of liquid emulsion.

This invention is applicable to processing photographic emulsions having a viscosity of 400 cp or less to provide a processed emulsion down to a viscosity of 2 cp.

The described viscosity lowering is particularly characteristic to photographic emulsion processing. Therefore the described process is of advantage with a photographic gelatino-silver halide emulsion. The described viscosity decrease is unexpected and is a new kind of emulsion processing in connection with emulsion coating. For coating processes where the substrate is coated by wetting in a closed coating chamber, a rather low viscosity of emulsion is required. Prior to the present invention the viscosity was kept low by diluting the emulsion with water. The disadvantage of this dilution lies in the higher drying needed for the coated substrate. Thus this invention provides a new method for saving in the drying step.

What is claimed is:

1. In a continuous process for providing a flowable gelatino-silver halide emulsion having a viscosity in the range of 2–100 cp for casting on a moving substrate by treating a gelatino-silver halide emulsion introduced into the process to reduce the emulsion viscosity, said viscosity being 20–400 cp at room temperature while substantially maintaining the aqueous content of the emulsion, the steps comprising:

introducing a gelatino-silver halide emulsion having a viscosity of 20–400 cp and an aqueous content sufficient to provide flowability into the head of an evaporator column and regulating the pressure in the head to between 60–200 mm Hg and a temperature between 42°–67°C, injecting into the emulsion from the head and under the pressure and temperature of the head ballast steam at a high steam velocity from an external source and mixing the steam up in the emulsion under a high shearing force of the ballast steam on the emulsion so that steam becomes entrained in the emulsion, flowing the emulsion in a thin film downwardly over a surface while being subject to a shearing gradient in the evaporator column from the head and under a pressure in the column of between 30–60 mm Hg and a temperature of between 29°–42°C, condensing in the downwardly flowing emulsion part of the entrained steam in the emulsion under the conditions of lower temperature and pressure in the column than in the head so that water from the condensed steam is incorporated in said emulsion, and separating the processed emulsion of reduced viscosity and the steam in a stage under a condition of equilibrium between temperature and steam pressure, and continuously recovering emulsion from the separating stage in a composition having a viscosity at room temperature of 2–100 cp and an aqueous content substantially the same as the initially introduced emulsion.

2. The process of claim 1 wherein the photographic emulsion is sprayed into the head and intimately mixed.

3. The process of claim 1 wherein the column surface is heated to heat the downwardly flowing film of emulsion to a temperature sufficient to evaporate from the emulsion a quantity of water equal to the quantity condensed in the emulsion.

4. In a process for coating a moving web support with a viscous photographic emulsion consisting of a viscosity-inducing plurality of light sensitive substances to form a layer of the viscous emulsion on the moving support in which the viscosity of the emulsion is adjusted in a falling film of the emulsion, the steps which comprise moving a thin film of the fluid emulsion having a viscosity of up to 400 cp downwardly in a falling film in an atmosphere of 50 mm Hg over a surface within an evaporator and under evaporating conditions, injecting steam under pressure into the evaporator at a pressure of 100–120 mm Hg and a temperature of 51°–55°C at a high velocity from an external source in a stream along the general direction of the major flow of said falling film and mixing the steam up in the emulsion under the relative displacement of the film and the steam stream, producing a shearing force on the thin film of liquid exposed to said steam, partially condensing said injected steam in said film of liquid, diluting the fluid emulsion with said condensed steam, heating said surface of said evaporator to such a temperature that the quantity of the condensed water is reevaporated and producing a viscosity of between 2 and 25 cp, and removing said processed fluid emulsion at a temperature determined by the pressure of said reduced atmosphere, and conveying the processed fluid emulsion to and applying the processed emulsion on the web support with no significant increase in viscosity.

* * * * *